(12) United States Patent
Abraham

(10) Patent No.: US 6,711,385 B1
(45) Date of Patent: Mar. 23, 2004

(54) COUPLER FOR WIRELESS COMMUNICATIONS

(75) Inventor: Charles Abraham, Marriottsville, MD (US)

(73) Assignee: Satius, Inc., Las Vegas, NV (US)

( * ) Notice: Subject to any disclaimer, the term of this patent is extended or adjusted under 35 U.S.C. 154(b) by 448 days.

(21) Appl. No.: 09/610,728

(22) Filed: Jul. 6, 2000

(51) Int. Cl.$^7$ ................................. H04B 1/46
(52) U.S. Cl. .................... 455/80; 455/280; 333/109; 333/124; 333/177
(58) Field of Search ............... 455/80–83, 280–283, 455/286–287, 289–290, 292; 333/124, 17.3, 131, 160, 177, 180, 109

(56) References Cited

U.S. PATENT DOCUMENTS

| | | |
|---|---|---|
| 3,714,661 A | 1/1973 | Kershaw |
| 3,825,931 A * | 7/1974 | Gonzalez et al. ............ 343/100 |
| 3,911,415 A | 10/1975 | Whyte |
| 3,943,447 A | 3/1976 | Shomo, III |
| 4,148,019 A | 4/1979 | Durkee |
| 4,206,464 A | 6/1980 | Hirsch |
| 4,514,594 A | 4/1985 | Brown et al. |
| 4,866,733 A | 9/1989 | Morishita |
| 4,944,299 A | 7/1990 | Silvian |
| 4,992,774 A | 2/1991 | McCullough |
| 5,032,820 A | 7/1991 | Tanikawa et al. |
| 5,061,941 A | 10/1991 | Lizzi et al. |
| 5,212,813 A | 5/1993 | Renaud |
| 5,214,392 A * | 5/1993 | Kobayashi et al. .......... 330/10 |
| 5,334,975 A | 8/1994 | Wachob et al. |
| 5,351,272 A | 9/1994 | Abraham |
| 5,420,579 A | 5/1995 | Urbas et al. |
| 5,504,427 A | 4/1996 | Cooper et al. |
| 5,559,377 A | 9/1996 | Abraham |
| 5,584,058 A | 12/1996 | Arnold |
| 5,592,482 A | 1/1997 | Abraham |
| 5,625,863 A | 4/1997 | Abraham |
| 5,717,685 A | 2/1998 | Abraham |
| 5,818,127 A | 10/1998 | Abraham |
| 5,891,183 A | 4/1999 | Zierhofer |
| 6,014,386 A | 1/2000 | Abraham |
| 6,023,106 A | 2/2000 | Abraham |
| 6,104,707 A | 8/2000 | Abraham |

FOREIGN PATENT DOCUMENTS

| | | | |
|---|---|---|---|
| EP | 0433752 | * 6/1991 | ........... H01F/23/00 |
| FR | 2 691 863 | 12/1993 | |
| WO | WO 90/13950 | 11/1990 | |

* cited by examiner

Primary Examiner—Lee Nguyen
(74) Attorney, Agent, or Firm—Akin, Gump, Strauss, Hauer & Feld, LLP

(57) ABSTRACT

An apparatus for communication of electric or electromagnetic signals over air includes a transmitter or receiver and a coupler. The coupler has a capacitive circuit connected with an air-core or dielectric-core transformer. The capacitive circuit resonates with the transformer at a preselected frequency. The coupler eliminates noise and is matched to the characteristic impedance of the air at the preselected frequency, which linearizes communication and allows high-speed data and voice communication over long distances.

50 Claims, 7 Drawing Sheets

COUPLER FOR WIRELESS COMMUNICATIONS

BACKGROUND OF THE INVENTION

The present invention relates generally to a coupler for wireless communications, and more particularly to the use of a novel air-core or dielectric core coupler as a matching device to the characteristic impedance of the air for a transmitter and receiver for wireless communications.

A well-known problem in wireless communications concerns the effects of reflections of a transmitted signal off of the walls of buildings, people, etc. on the transmitted signal as in propagates through the air. These reflected signals cause notches that come and go in the bandwidth where communication takes place, thus degrading transmitted signals. Any such degradation of transmitted signals in wireless communications are extremely costly because it will limit the usage of bandwidth which will result in slower communication speeds and in certain areas the communication devices will not work or will work poorly.

Most of the work to find solutions to the problems of signal losses due to reflected signals has focused on digital signal processing techniques such as Spread Spectrum and CDMA. In Spread spectrum techniques, the bandwidth of a transmitted signal is spread over a large range of bandwidth to communicate the same information in several frequencies. This way, notches in the communications bandwidth will not stop communication to everywhere. The drawback with this technology is that the need to use a wide bandwidth and the interference that is generated from the transmitter and from reflections can result in a complete inability to communicate.

The CDMA technology uses a single carrier frequency and is capable of detecting reflected signals in delayed time sequence. In theory, this should work fine, but, in reality, very fast sampling is required as well as the ability to detect very weak signals. This means a very high price today for effective communications. Also, due to non-real-time communication detection, this technology is probably limited to a couple of MBps transmission speed.

Moreover, regardless of the utility of techniques such as CDMA, reflected signals will still cause notches in the communications band of interest as a result of the basic physics that limits the antenna as a matching device for transmitters and receivers. The characteristic impedance change in the air from walls and other objects reflects back to the transmitter and receiver, which causes notches in the communications bandwidth. The two impedances (air and transmitter/receiver) need to be matched to each other to avoid notches in the communications bandwidth.

There is thus a need for a coupler that is capable of matching the impedance of the air with the impedance of a wireless transmitter and receiver in order to eliminate notches in the communications bandwidth.

SUMMARY OF THE INVENTION

Briefly stated, in a first embodiment, the present invention is a communications apparatus for transmitting electric or electromagnetic signals over air having a characteristic impedance. The communications apparatus comprises:

a transmitter having an output impedance, the transmitter for transmitting the electric or electromagnetic signals at a preselected frequency; and a coupler connected to the transmitter, the coupler comprising a transformer having a non-magnetic core, the transformer communicating the electric or electromagnetic signals to the air, the coupler matching the output impedance of the transmitter to the characteristic impedance of the air.

In a second embodiment, the present invention is a communications apparatus for receiving electric or electromagnetic signals from air having a characteristic impedance. The communications apparatus comprises:

a receiver having an input impedance, the receiver for receiving the electric or electromagnetic signals at a preselected frequency; and a coupler connected to the receiver, the coupler comprising a transformer having a non-magnetic core, the transformer receiving the electric or electromagnetic signals from the air, the coupler matching the input impedance of the receiver to the characteristic impedance of the air.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown. In the drawings, like numerals are used to indicate like elements throughout. In the drawings.

DETAILED DESCRIPTION OF THE INVENTION

My co-pending U.S. patent application Ser. No. 09/344,258 ("the '258 Application"), now U.S. Pat. No. 6,104,707, discloses a novel phase shift linear power, phone, twisted pair, and coaxial line coupler for both transmission and reception. The phase shift linear coupler comprises a novel air-core or dielectric core transformer which can be used for phone line, coaxial, LAN and power line communication through power line transformers. The phase shift linear coupler further comprises an associated coupling capacitor network in order to achieve resistive matching to approximately the lowest known value of the line characteristic impedance and to maximize stable signal transmission onto the line. This resonance effectively creates a band pass filter at carrier frequency. The disclosure of the '258 Application is incorporated herein by reference in its entirety.

The present invention uses the novel phase shift linear coupler of the '258 Application to match the impedance of the air with the impedance of a wireless transmitter and receiver in order to eliminate notches in the communications bandwidth.

The importance of the coupler of the present invention is that it can remain a matching device to the characteristic impedance of the air. As in the '258 Application, the coupler of the present invention comprises an air-core or dielectric-core transformer and an optional coupling capacitor, Ceq. Any impedance change on the primary winding of the transformer does not reflect much to the secondary winding of the transformer and vice versa. Therefore, the only impedance that will be seen by the air is the primary winding, either alone or resonated with the capacitor Ceq. Such serial or parallel resonance will create a low impedance, which will be close to 1 ohm. As the frequency is increased, the impedance will increase also to approximately 100–200 ohm, depending on which impedance is the best to match the air characteristic impedance, and how much bandwidth is needed.

Figure 1:
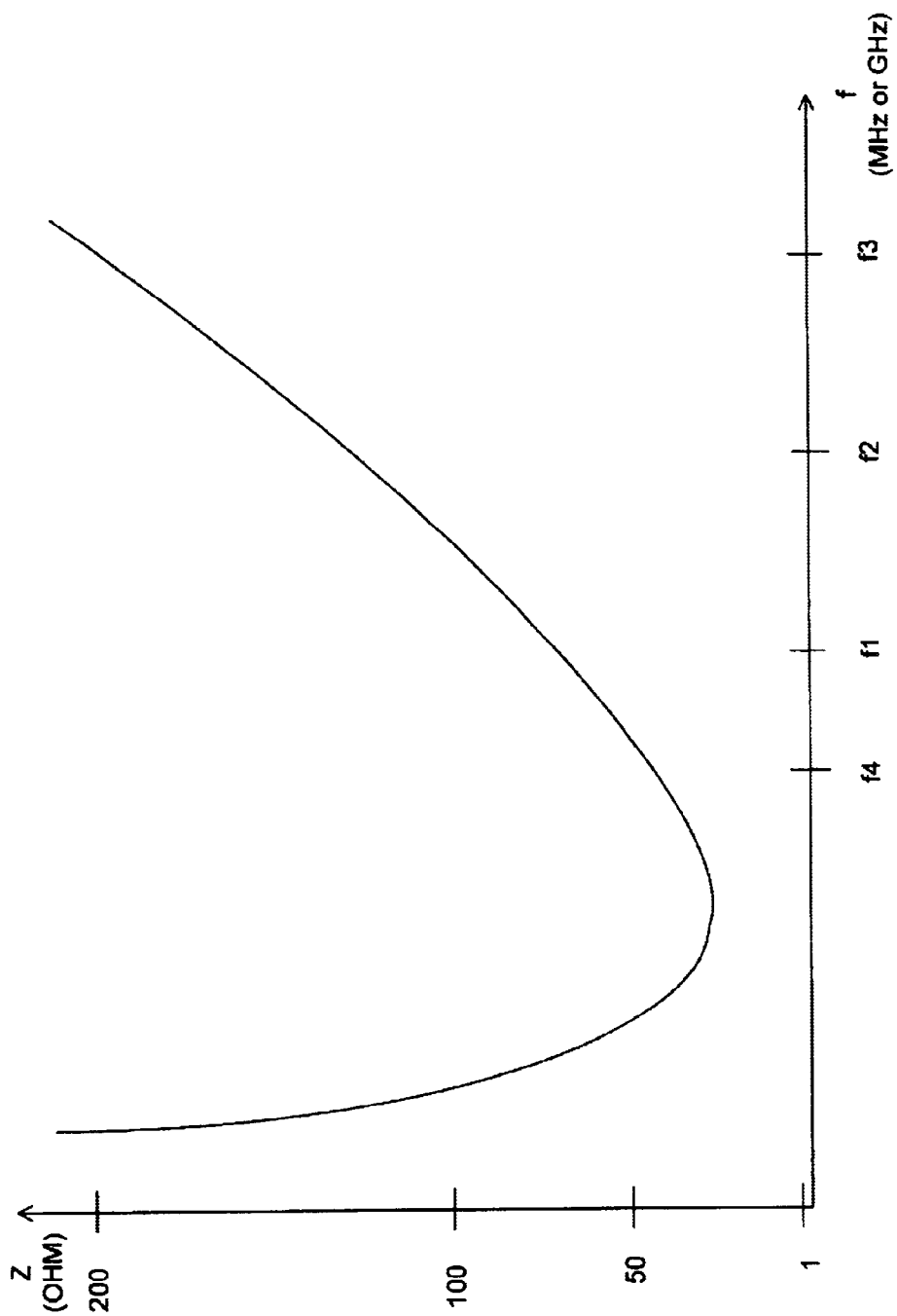
FIG. 1 is a graphical illustration of the characteristic impedance of the air-core coupler of the present invention.

For example, FIG. 1 shows the coupler characteristic impedance to the air. If the air impedance is 100 ohm at F1 then 6 dB matching from the coupler will be from 50 ohm (F4) to 200 ohm (F3), which will cover a wide bandwidth from F3 to F4. By contrast, if the air characteristic impedance is only 10 ohm, the 6 dB matching will be from 5 to 20 ohm, resulting in a smaller bandwidth. For this reason, there is a wider bandwidth outside of homes and buildings than inside, where the air characteristic impedance is smaller. Lowering the coupler impedance can result in wider bandwidth matching in low characteristic impedance (e.g., 10 ohm) air.

As discussed in the '258 Application, a significant advantage of the coupler of the present invention is the phase linearity achieved. The matching produced by the coupler of the present invention can open up wide linear bandwidth communication over air at rates of up to several Gbps.

As in the '258 Application, the coupler of the present invention preferably has two coaxial solenoids or air-coils of different diameter with primary and secondary inductances L1 and L2 respectively. Both L1 and L2 are inductively and capacitively coupled creating an air-core transformer. Preferably, the air-gap is filled with resin, which reduces inductive loading effects from the coupler secondary to the primary by using the capacitance created in the air core transformer. The size of the gap is selected to reduce inductive loading effects from the coupler secondary to the primary. A coupling capacitor, Ceq, is also preferably provided.

Inductive loading effects from the secondary to the primary of the air-core transformer are minimized at the transmit/receive frequency. The effective transceiver input impedance, as seen at the secondary (inside coil), can be designed to be 55 OHM inductive. The effective air and reflected devices input impedance, as seen at the primary (outer coil), is equal to an impedance that is created by the resonance of the coupling capacitor Ceq and the primary inductance at a given frequency. Its value can be chosen to optimally match the air characteristic impedance (Zo).

Figure 2:
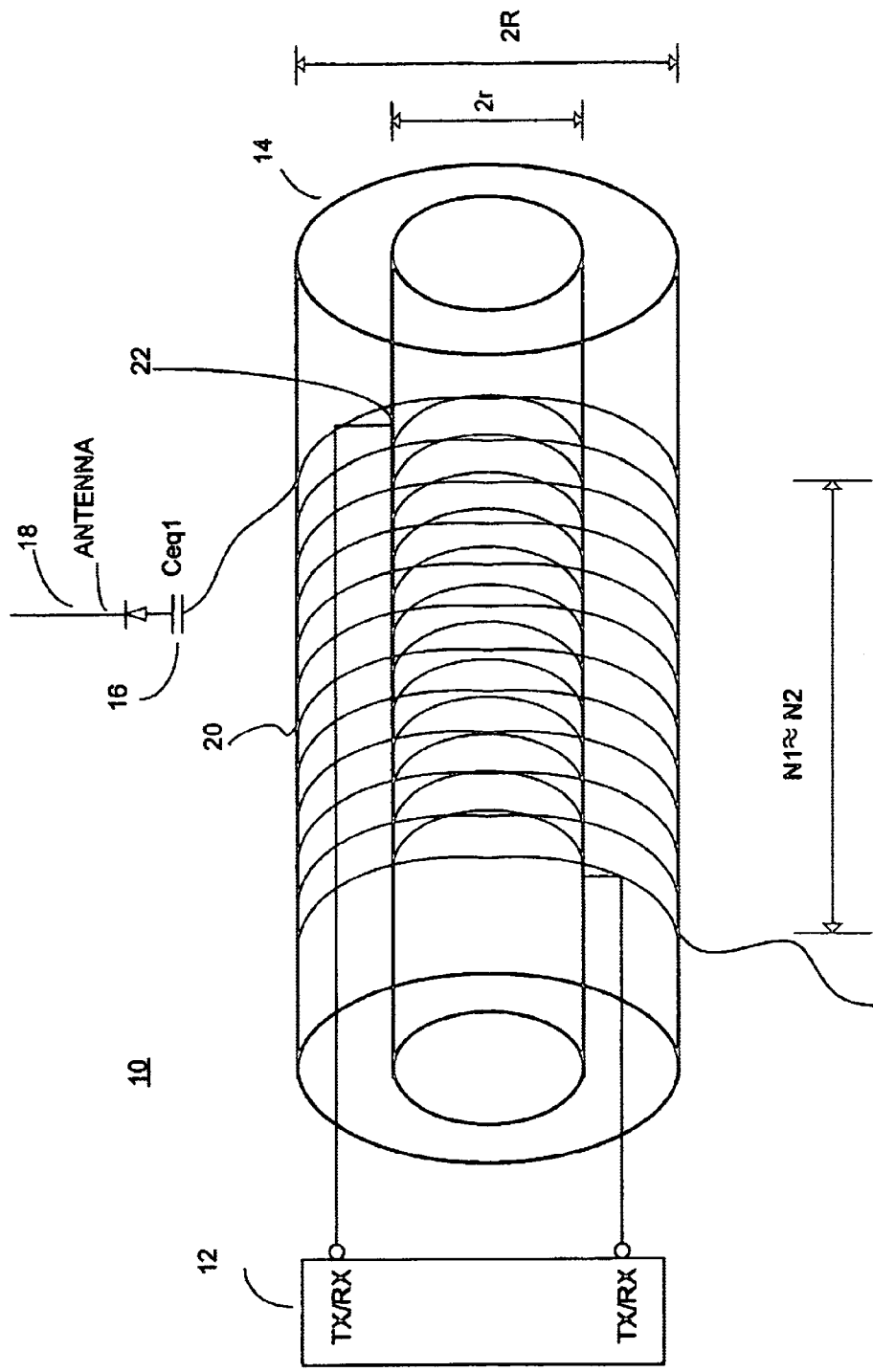
FIG. 2 is a combination schematic and block diagram of an air-core wireless transmitter/receiver according to a first preferred embodiment of the present invention.

Referring now to the drawings, wherein like numeral designate like or corresponding parts throughout each of the several views, there is shown in FIG. 2 a first preferred embodiment of an air-core transmitter/receiver 10 according to the present invention. The air-core transmitter/receiver 10 includes a wireless transmitter or receiver 12, an air-core transformer 14, a tuning capacitor (Ceq1) 16, and an antenna 18. Any wireless transmitter or receiver 12 can be used with the present invention, for both mobile units and base stations.

The air-core transformer 14 has a novel, air coil structure which functions as a respective inductively and capacitively coupled air-core transformer for both transmission and reception. The air-core transformer 14 is phase shift linear and comprises a primary winding 20 and a smaller, coaxial secondary winding 22. The primary winding 20 has a winding diameter 2R which is greater than a diameter of the secondary winding 2r. Accordingly, an air gap is created between the primary winding 20 and the secondary winding 22. Of particular significance is the fact that both the primary and secondary windings 20, 22 of the air-core transformer 14 can have about the same number of turns (designated by N1=N2), and are thus at a 1:1 ratio. Accordingly the transmitter or receiver 12 does not require a high transmission voltage. Further Ceq1 16 is set to resonate with the primary winding 20 at the carrier frequency FA, thus creating a band pass filter at the carrier frequency FA. This maximizes the current at the carrier frequency FA.

The transmitter or receiver is connected to the secondary winding 22 of the air core transformer 14, which will match approximately 50 OHM at the frequency of interest FA. The primary winding 20 of the air-core transformer 14 is connected in series with Ceq1 16 and the antenna 18. The primary winding is designed to match the most common characteristic impedance of the air where the wireless transmitter/receiver will be used. The primary winding 20 is also preferably connected to a ground 24. Although it is not necessary to ground the primary winding 20, it is desirable to do so, because the efficiency of the transmitter/receiver 12 will be increased.

Any antenna 18 may be used with the present invention, although the antenna 18 is preferably designed to match the air core transformer 14 and the desired transmission or reception frequency FA.

For higher frequencies (e.g., 200 Mhz–500 GHz), the structure of the air-core or dielectric core transformer differs from that of the '258 Application. Such alternative transformer designs are also preferable for use in the present invention with wireless transmitters/receivers where small size is important—e.g., particularly in mobile units. The coupler may no longer be two coaxial solenoids or air-coils of different diameter wrapped with magnet wire, but instead is much smaller and resembles a chip which is filled with any type of plastic or non-conductive material, such as resin, glue material, ceramic or any other hard non-conductive material ("chip material"). The coupler preferably comprises very thin conductive plates separated by chip material. The plates are preferably made from copper, but can also be made from silver, gold, or any other conductive material, whether it is active or passive. The plates can be any shape (e.g., square, rectangular, round, etc.) but are preferably circular. The size of such layered air-core transformers will depend on the frequency of usage. For example, a 30 GHz coupler primary diameter will be less then 1 millimeter, the layer thickness will be less then about 0.1 millimeter, which results in about a 0.3 nH inductance. Similarly, the thin rectangular copper plate sizes will be around a couple of millimeters long, 0.1 millimeters thick and the primary and secondary inductors will be about 0.5 millimeters away from each other, on top of each other. Consequently, such devices will look like a very small capacitor. However, the present invention uses the end to end inductor values to resonate the capacitor for matching the power line characteristic impedance.

Alternatively, the plates can be formed directly in a chip by deposition of metallic layers or through doping silicon. Doped silicon is conductive when it is active—e.g., a DC level of voltage turns on a transistor to make it an active device. Thus, the plates when formed of doped silicon may take the form of some type of active device such as a transistor or a diode. Of course, it will be appreciated that other designs of air-core or dielectric-core transformers can be used without departing from the spirit or scope of the present invention. For example, a piece of coax cable can be used as an air-core transformer. The shield of the coax cable is the primary of the transformer and the inside wire is the secondary of the transformer. This coax type of air-core transformer can be used for very high frequency communications above 500 MHz. Similarly two copper or iron pipes (or aluminum or copper foil) can be placed inside each other. The outside pipe or foil is the primary of the air-core transformer, and the inner pipe or foil is the secondary. This design can also be used over 100 MHz.

One of ordinary skill in the art will also appreciate that other more simple integrated circuits can also be used to create transformers for use in the coupler of the present invention. Today's integrated circuits using active transistors can simulate and/or create an aircore transformer that can have the necessary inductance and capacitance values to work exactly as a regular air-core transformer.

Although the structure of the couplers as described above differs from that disclosed in the '258 Application, the function of the coupler is the same. The plates (or pipes or foils) of the coupler are inductively and capacitively coupled creating an air-core or dielectric-core transformer. The coupling of the primary and secondary of the transformer varies with frequency, however. The primary and secondary are coupled about equally magnetically and electrically (i.e., capacitively and inductively coupled) below 100 MHz of frequency and more inductively coupled (magnetically) at frequencies higher than 100 MHz. At frequencies on the order of 100 GHz, the primary and secondary of the transformer will be mostly inductively coupled.

Figure 3:
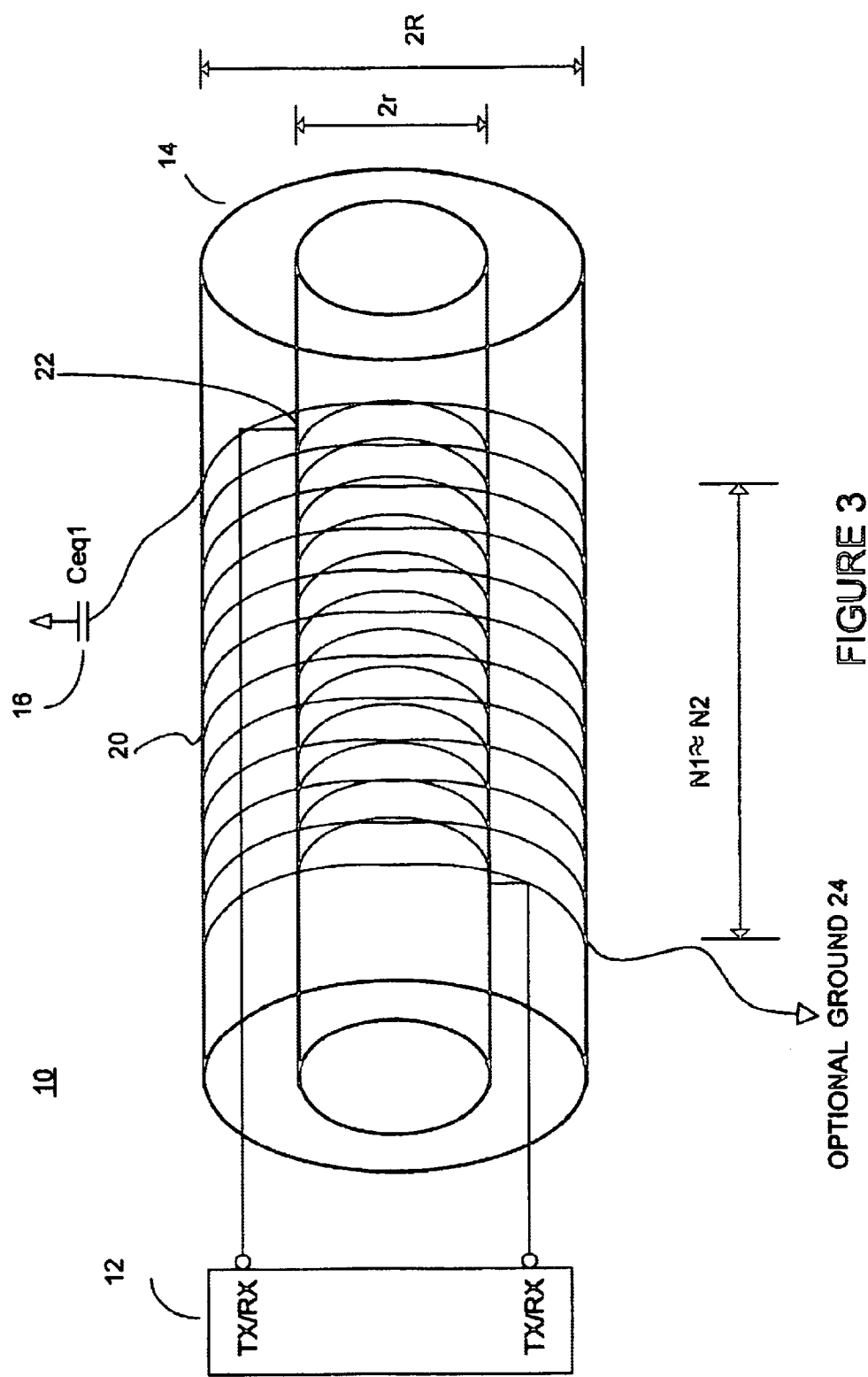
FIG. 3 is a combination schematic and block diagram of an air-core wireless transmitter/receiver according to a second preferred embodiment of the present invention.

Turning to FIG. 3, a second preferred embodiment of the air-core transmitter/receiver 10 according to the present invention is shown. The second preferred embodiment is identical to the first preferred embodiment except as described below. As shown in FIG. 3, no antenna 18 is used in this embodiment, but rather the serial tuning capacitor (Ceq1) 16 serves as the antenna. The serial tuning capacitor (Ceq1) 16 will resonate with the primary winding 20 of the air-core transformer 14 at the communications frequency of interest FA.

Figure 4:
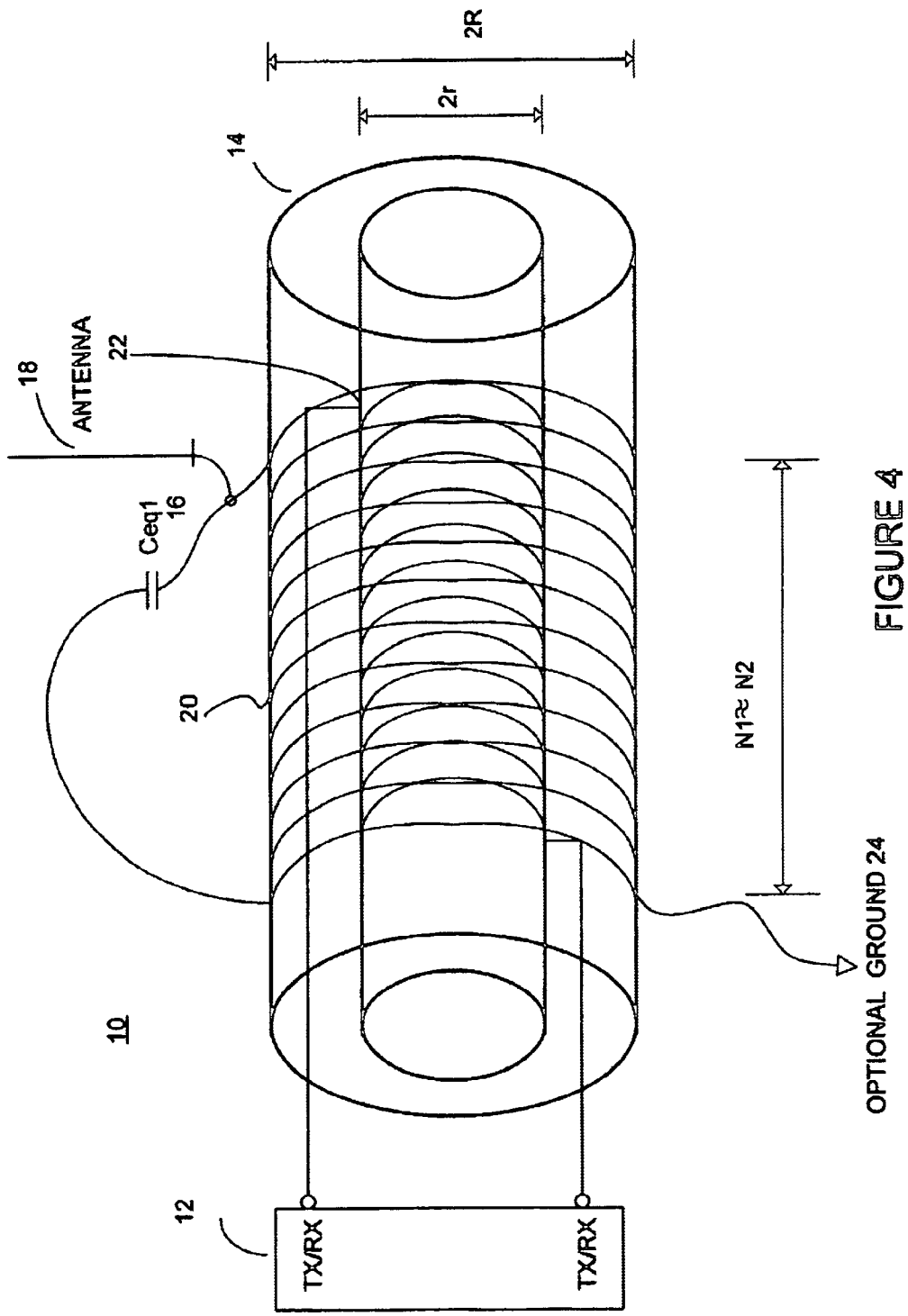
FIG. 4 is a combination schematic and block diagram of an air-core wireless transmitter/receiver according to a third preferred embodiment of the present invention.

In a third preferred embodiment of the air-core transmitter/receiver 10 of the present invention, which is identical to the first preferred embodiment except as discussed below, a parallel tuning capacitor (Ceq1) 16 is used rather than a serial tuning capacitor (Ceq1) 16. As shown in FIG. 4, the tuning capacitor (Ceq1) 16 is connected in parallel with the primary winding 20 of the air-core transformer 14. The primary winding 20 is also connected to the antenna 18. The primary winding 20 resonates in parallel with Ceq1 16 at the frequency of interest FA.

Figure 5:
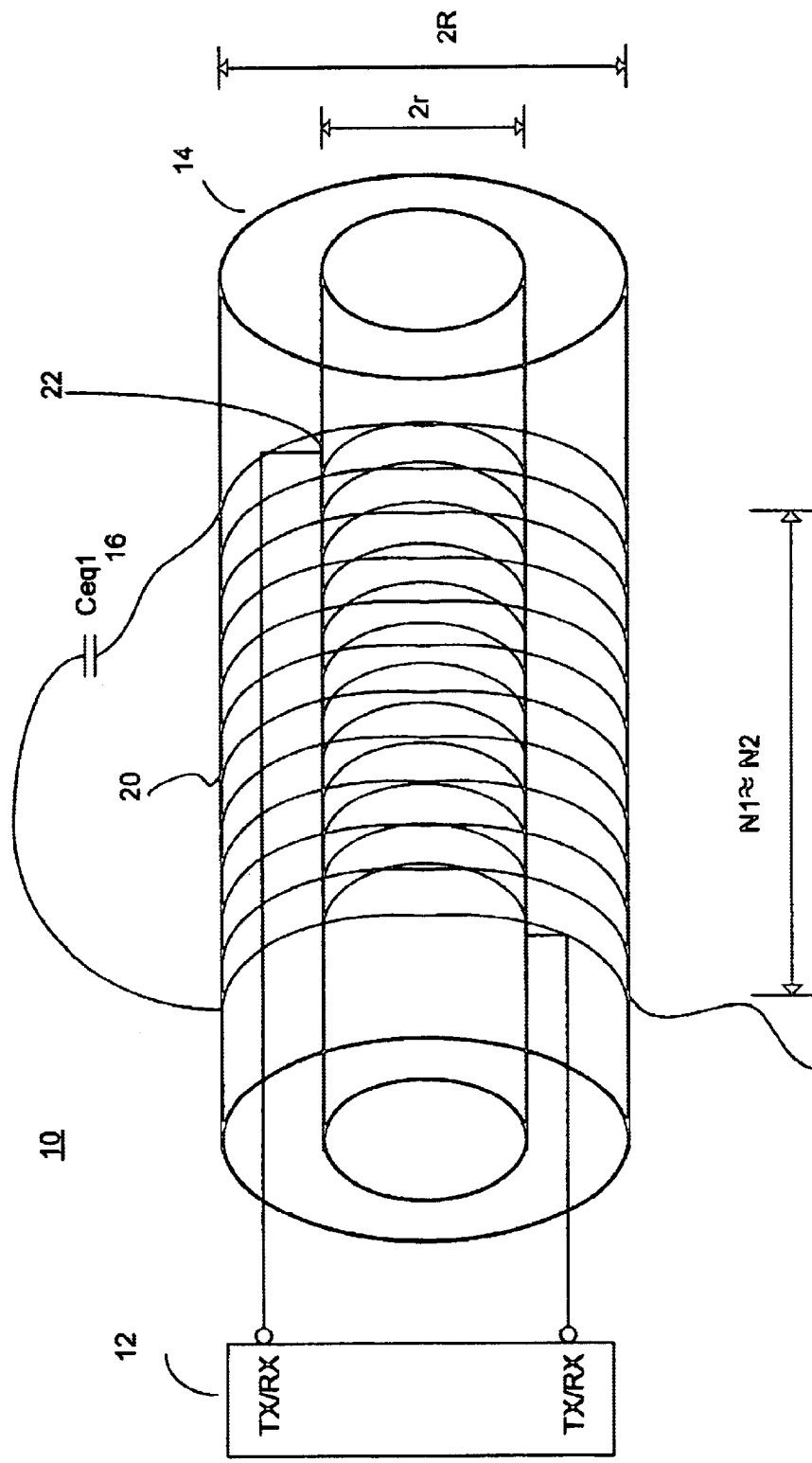
FIG. 5 is a combination schematic and block diagram of an air-core wireless transmitter/receiver according to a fourth preferred embodiment of the present invention.

Turning to FIG. 5, a fourth preferred embodiment of the air-core transmitter/receiver 10 according to the present invention is shown. The fourth preferred embodiment is identical to the third preferred embodiment except as described below. As shown in FIG. 5, no antenna 18 is used in this embodiment, but rather the parallel tuning capacitor (Ceq1) 16 serves as the antenna. The parallel tuning capacitor (Ceq1) 16 resonates with the primary winding 20 of the air-core transformer 14 at the communications frequency of interest FA.

Figure 6:
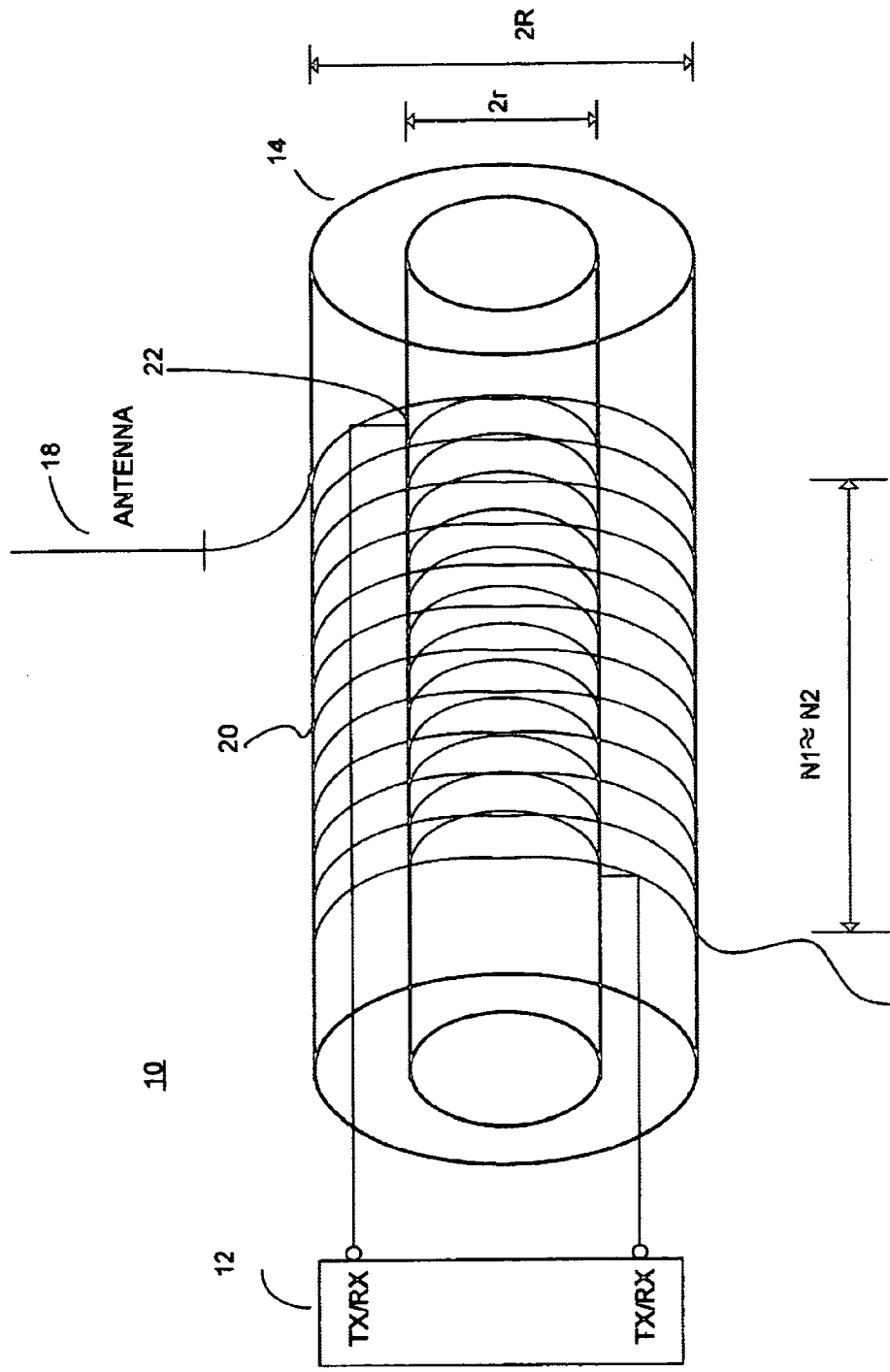
FIG. 6 is a combination schematic and block diagram of an air-core wireless transmitter/receiver according to a fifth preferred embodiment of the present invention.

In a fifth preferred embodiment of the air-core transmitter/receiver 10 of the present invention, which is identical to the first preferred embodiment except as discussed below, no tuning capacitor (Ceq1) 16 is used. As shown in FIG. 6, the antenna 18 is connected directly to the primary winding 20 of the air-core transformer 14. The primary winding 20 resonates at the frequency of interest FA.

Figure 7:
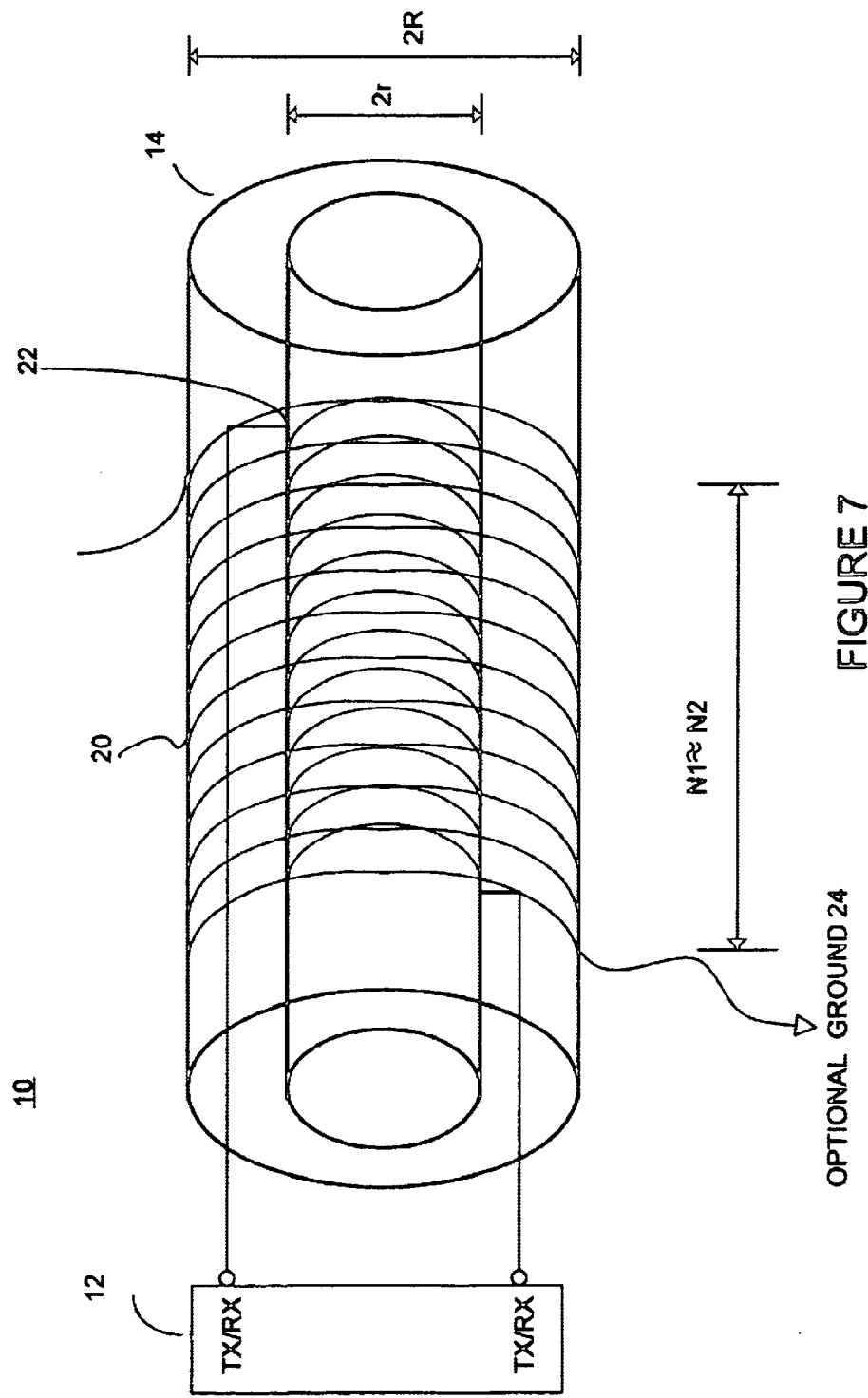
FIG. 7 is a combination schematic and block diagram of an air-core wireless transmitter/receiver according to a sixth preferred embodiment of the present invention.

Finally, turning to FIG. 7, a sixth preferred embodiment of the air-core transmitter/receiver 10 according to the present invention is shown. The sixth preferred embodiment is identical to the fifth preferred embodiment except as described below. As shown in FIG. 7, no antenna 18 is used in this embodiment, but rather the primary winding 20 of the air-core transformer 14 serves as the antenna. The primary winding 20 of the air-core transformer 14 resonates at the communications frequency of interest FA.

It will be appreciated by those skilled in the art that changes could be made to the embodiments described above, without departing from the broad inventive concept thereof. It is understood, therefore, that this invention is not limited to the particular embodiment disclosed, but it is intended to cover modifications within the spirit and scope of the present invention.

What is claimed is:

1. A communications apparatus for transmitting electric or electromagnetic signals over air, the air having a characteristic impedance, the communications apparatus comprising:
    a transmitter having an output impedance, said transmitter for transmitting the electric or electromagnetic signals at a preselected frequency; and
    a coupler connected to the transmitter, said coupler comprising a transformer having a non-magnetic core, said transformer communicating the electric or electromagnetic signals to the air, said coupler matching the output impedance of the transmitter to the characteristic impedance of the air.

2. The communications apparatus of claim 1 wherein the transformer is an air-core transformer.

3. The communications apparatus of claim 2 wherein the transformer comprises:
    a primary coil having a first diameter;
    a secondary coil having a second smaller diameter, said second coil extending coaxially within the primary coil such that an air gap is created between the primary coil and the secondary coil;
    wherein the primary coil is matched to the characteristic impedance of the air at a preselected bandwidth.

4. The communications apparatus of claim 3 wherein the transformer further comprises a capacitor connected in series with the primary coil, wherein the primary coil and the capacitor are matched to the characteristic impedance of the air at the preselected bandwidth.

5. The communications apparatus of claim 4 further comprising an antenna attached to the capacitor.

6. The communications apparatus of claim 3 wherein the transformer further comprises a capacitor connected in parallel with the primary coil, wherein the primary coil and the capacitor are matched to the characteristic impedance of the air at the preselected bandwidth.

7. The communications apparatus of claim 6 further comprising an antenna attached to the primary coil.

8. The communications apparatus of claim 1 wherein the transformer is a dielectric-core transformer.

9. The communications apparatus of claim 8 wherein the core of the transformer is filled with a resin material.

10. The communications apparatus of claim 1 wherein the transformer is a solid-state transformer.

11. The communications apparatus of claim 1 wherein the transformer comprises:
- a first conductive plate;
- a second conductive plate placed underneath and spaced apart from the first conductive plate;
- wherein the first conductive plate is matched to the characteristic impedance of the air at a preselected bandwidth.

12. The communications apparatus of claim 11 wherein the transformer further comprises a capacitor connected in series with the first conductive plate, wherein the first conductive plate and the capacitor are matched to the characteristic impedance of the air at the preselected bandwidth.

13. The communications apparatus of claim 12 further comprising an antenna attached to the capacitor.

14. The communications apparatus of claim 11 wherein the transformer further comprises a capacitor connected in parallel with the first conductive plate, wherein the first conductive plate and the capacitor are matched to the characteristic impedance of the air at the preselected bandwidth.

15. The communications apparatus of claim 14 further comprising an antenna attached to the first conductive plate.

16. The communications apparatus of claim 11 wherein the first conductive plate and the second conductive plate are separated by chip material.

17. The communications apparatus of claim 11 wherein the first conductive plate and the second conductive plate are circular in shape.

18. The communications apparatus of claim 11 wherein the first conductive plate and the second conductive plate are formed directly in a chip by deposition of metallic layers onto the chip.

19. The communications apparatus of claim 11 wherein the first conductive plate and the second conductive plate are formed from doped silicon.

20. The communications apparatus of claim 1 wherein the transformer comprises:
- a first metal pipe having a first diameter;
- a second metal pipe having a second smaller diameter, said second pipe extending coaxially within the first pipe such that an air gap is created between the first pipe and the second pipe;
- wherein the first pipe is matched to the characteristic impedance of the air at a preselected bandwidth.

21. The communications apparatus of claim 20 wherein the transformer further comprises a capacitor connected in series with the first pipe, wherein the first pipe and the capacitor are matched to the characteristic impedance of the air at the preselected bandwidth.

22. The communications apparatus of claim 21 further comprising an antenna attached to the capacitor.

23. The communications apparatus of claim 20 wherein the transformer further comprises a capacitor connected in parallel with the first pipe, wherein the first pipe and the capacitor are matched to the characteristic impedance of the air at the preselected bandwidth.

24. The communications apparatus of claim 23 further comprising an antenna attached to the first pipe.

25. The communications apparatus of claim 1 further comprising an antenna attached to the coupler.

26. A communications apparatus for receiving electric or electromagnetic signals from air, the air having a characteristic impedance, the communications apparatus comprising:
- a receiver having an input impedance, said receiver for receiving the electric or electromagnetic signals at a preselected frequency; and
- a coupler connected to the receiver, said coupler comprising a transformer having a non-magnetic core, said transformer receiving the electric or electromagnetic signals from the air, said coupler matching the input impedance of the receiver to the characteristic impedance of the air.

27. The communications apparatus of claim 26 wherein the transformer is an air-core transformer.

28. The communications apparatus of claim 27 wherein the transformer comprises:
- a primary coil having a first diameter;
- a secondary coil having a second smaller diameter, said second coil extending coaxially within the primary coil such that an air gap is created between the primary coil and the secondary coil;
- wherein the primary coil is matched to the characteristic impedance of the air at a preselected bandwidth.

29. The communications apparatus of claim 28 wherein the transformer further comprises a capacitor connected in series with the primary coil, wherein the primary coil and the capacitor are matched to the characteristic impedance of the air at the preselected bandwidth.

30. The communications apparatus of claim 29 further comprising an antenna attached to the capacitor.

31. The communications apparatus of claim 28 wherein the transformer further comprises a capacitor connected in parallel with the primary coil, wherein the primary coil and the capacitor are matched to the characteristic impedance of the air at the preselected bandwidth.

32. The communications apparatus of claim 31 further comprising an antenna attached to the primary coil.

33. The communications apparatus of claim 26 wherein the transformer is a dielectric-core transformer.

34. The communications apparatus of claim 33 wherein the core of the transformer is filled with a resin material.

35. The communications apparatus of claim 26 wherein the transformer is a solid-state transformer.

36. The communications apparatus of claim 26 wherein the transformer comprises:
- a first conductive plate;
- a second conductive plate placed underneath and spaced apart from the first conductive plate;
- wherein the first conductive plate is matched to the characteristic impedance of the air at a preselected bandwidth.

37. The communications apparatus of claim 36 wherein the transformer further comprises a capacitor connected in series with the first conductive plate, wherein the first conductive plate and the capacitor are matched to the characteristic impedance of the air at the preselected bandwidth.

38. The communications apparatus of claim 37 further comprising an antenna attached to the capacitor.

39. The communications apparatus of claim 36 wherein the transformer further comprises a capacitor connected in parallel with the first conductive plate, wherein the first conductive plate and the capacitor are matched to the characteristic impedance of the air at the preselected bandwidth.

40. The communications apparatus of claim 39 further comprising an antenna attached to the first conductive plate.

41. The communications apparatus of claim 36 wherein the first conductive plate and the second conductive plate are separated by chip material.

42. The communications apparatus of claim 36 wherein the first conductive plate and the second conductive plate are circular in shape.

43. The communications apparatus of claim 36 wherein the first conductive plate and the second conductive plate are formed directly in a chip by deposition of metallic layers onto the chip.

44. The communications apparatus of claim 36 wherein the first conductive plate and the second conductive plate are formed from doped silicon.

45. The communications apparatus of claim 26 wherein the transformer comprises:

a first metal pipe having a first diameter;

a second metal pipe having a second smaller diameter, said second pipe extending coaxially within the first pipe such that an air gap is created between the first pipe and the second pipe;

wherein the first pipe is matched to the characteristic impedance of the air at a preselected bandwidth.

46. The communications apparatus of claim 45 wherein the transformer further comprises a capacitor connected in series with the first pipe, wherein the first pipe and the capacitor are matched to the characteristic impedance of the air at the preselected bandwidth.

47. The communications apparatus of claim 46 further comprising an antenna attached to the capacitor.

48. The communications apparatus of claim 45 wherein the transformer further comprises a capacitor connected in parallel with the first pipe, wherein the first pipe and the capacitor are matched to the characteristic impedance of the air at the preselected bandwidth.

49. The communications apparatus of claim 48 further comprising an antenna attached to the first pipe.

50. The communications apparatus of claim 26 further comprising an antenna attached to the coupler.

* * * * *